(12) United States Patent
Barlag et al.

(10) Patent No.: US 9,216,653 B2
(45) Date of Patent: Dec. 22, 2015

(54) METHOD FOR CHARGING AN ELECTRIC VEHICLE BY SUPPLYING DC OVER A CABLE CONFIGURED FOR AC CHARGING

(75) Inventors: Heike Barlag, Nürnberg (DE); Markus Böhm, Möhrendorf (DE); Jörg Heuer, Oberhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 282 days.

(21) Appl. No.: 13/825,324

(22) PCT Filed: Aug. 31, 2011

(86) PCT No.: PCT/EP2011/065025
§ 371 (c)(1),
(2), (4) Date: Jun. 3, 2013

(87) PCT Pub. No.: WO2012/038225
PCT Pub. Date: Mar. 29, 2012

(65) Prior Publication Data
US 2013/0249484 A1  Sep. 26, 2013

(30) Foreign Application Priority Data
Sep. 21, 2010  (DE) .......................... 10 2010 041 135

(51) Int. Cl.
*H02J 7/00* (2006.01)
*B60L 11/18* (2006.01)

(52) U.S. Cl.
CPC ......... *B60L 11/1809* (2013.01); *B60L 11/1818* (2013.01); *B60L 11/1838* (2013.01);
(Continued)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| | | | | |
|---|---|---|---|---|
| 5,346,406 A | * | 9/1994 | Hoffman et al. | 439/474 |
| 6,371,768 B1 | * | 4/2002 | Neblett et al. | 439/34 |
| 8,649,443 B2 | * | 2/2014 | Varadarajan et al. | 375/257 |
| 2009/0256523 A1 | * | 10/2009 | Taguchi | 320/109 |

(Continued)

FOREIGN PATENT DOCUMENTS

| | | |
|---|---|---|
| CA | 2648972 A1 | 6/2009 |
| EP | 2039560 A1 | 3/2009 |
| GB | 2460500 A | 12/2009 |
| WO | 2012/038225 A2 | 3/2012 |

OTHER PUBLICATIONS

International Search Report and Written Opinion, Application No. PCT/EP2011/065025, 17 pages, Apr. 2, 2012.

*Primary Examiner* — Arun Williams
(74) *Attorney, Agent, or Firm* — Slayden Grubert Beard PLLC

(57) ABSTRACT

A method is disclosed for charging at least one energy store of an electric vehicle via a charging point, using a first terminal having first connecting elements of a charging cable connected to the charging point. The first connecting elements are connected to corresponding second connecting elements of a second terminal on the vehicle, and the first and second connecting elements are designed to supply alternating current for charging the at least one energy store. Direct current from the charging point for charging the at least one energy store is supplied to the electric vehicle via at least two first connecting elements or at least two third connecting elements of the first terminal, wherein PLC communication between the electric vehicle and charging point in order to exchange information relating to the charging operation occurs via one or more first connecting elements on which no direct current for charging is carried.

13 Claims, 2 Drawing Sheets

(52) U.S. Cl.
CPC ......... *B60L11/1877* (2013.01); *B60L 2230/12* (2013.01); *Y02T 10/7005* (2013.01); *Y02T 10/705* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | |
|---|---|---|---|
| 2011/0169447 A1 | 7/2011 | Brown et al. | 320/109 |
| 2011/0245987 A1* | 10/2011 | Pratt et al. | 700/295 |
| 2013/0249484 A1 | 9/2013 | Barlag et al. | 320/109 |

* cited by examiner

METHOD FOR CHARGING AN ELECTRIC VEHICLE BY SUPPLYING DC OVER A CABLE CONFIGURED FOR AC CHARGING

CROSS-REFERENCE TO RELATED APPLICATIONS

This application is a U.S. National Stage Application of International Application No. PCT/EP2011/065025 filed Aug. 31, 2011, which designates the United States of America, and claims priority to DE Patent Application No. 10 2010 041 135.3 filed Sep. 21, 2010. The contents of which are hereby incorporated by reference in their entirety.

TECHNICAL FIELD

The disclosure relates to a method for charging at least one energy store of an electric vehicle and a corresponding charging point and a corresponding electric vehicle.

BACKGROUND

The electric energy store of electric vehicles can nowadays be recharged at charging points provided for this purpose. To this end, the vehicle user connects his vehicle to the charging point via a charging cable and initializes the charging operation in a suitable manner, for example by means of authentication using a code at the charging point. During the course of the charging operation, information relating to the charging operation is transmitted via one or more communication channels between the vehicle and the charging point.

It is known in the context of the charging of an electric vehicle with alternating current, to use a charging cable with a terminal, via the connecting elements of which, in addition to the supply of alternating current, so-called PLC communication (PLC=power line communication) is implemented by means of the conductors connected to the connecting elements in the charging cable. PLC communication is known and facilitates data transmission via conductors provided per se to conduct current and voltage (for example 230 volt mains voltage). At the same time, the data signal in the radio-frequency range is modulated to the power supply.

PLC communication performed via the charging-current carrying conductors during alternating-current charging of an electric vehicle has several drawbacks. In particular, the use of charging-current-carrying conductors results in strong electromagnetic emission or to the injection of external electromagnetic radiation since, as a rule, there is no electromagnetic screening for such conductors. This results in an association problem in that it cannot be safely assumed for either the vehicle or the charging point that the signals transmitted via PLC communication originate from a remote station connected to one end of the charging cable. In particular, the electromagnetic emission or injection also enables signals to be received from an adjacent cable. Another problem is that of bandwidth reduction because the signals injected in the conductor reduce the bandwidth available for communication with the remote station. It is also possible that a regulatory problem could occur since, due to the strong electromagnetic emission from PLC communication, in some circumstances, this type of communication within the scope of charging an electric vehicle is not permitted to be used in certain countries.

SUMMARY

One embodiment provides a method for charging at least one energy store of an electric vehicle via a charging point using a first terminal having first connecting elements of a charging cable connected to the charging point, wherein the first connecting elements are connected to corresponding second connecting elements of a second terminal on the vehicle side and the first and second connecting elements are designed to supply alternating current for charging the at least one energy store, wherein direct current from the charging point for charging the at least one energy store is supplied to the electric vehicle via at least two first connecting elements or at least two separate third connecting elements of the first terminal, wherein PLC communication between the electric vehicle and charging point in order to exchange information relating to the charging operation takes place via one or more first connecting elements on which no direct current for charging is carried.

In a further embodiment, the conductor or conductors in the charging cable, which lead to the first connecting element or elements via which the PLC communication takes place, are electromagnetically screened.

In a further embodiment, the electromagnetically screened conductor or the electromagnetically screened conductors are designed as twisted pairs and/or have a metallic screening.

In a further embodiment, during the charging with direct current from the charging point, one or more non-current-carrying conductors are arranged between the conductor or conductors in the charging cable, which lead to the first connecting element or elements, via which the PLC communication takes place, and the conductors, which lead to the at least two first connecting elements, via which direct current is supplied from the charging point for charging the at least one energy store.

In a further embodiment, the first connecting element or elements, via which the PLC communication during the charging with direct current takes place, correspond to the first connecting elements which are used during the charging with alternating current for PLC communication.

In a further embodiment, the direct current is supplied via a charging cable, which is attached to the charging point.

In a further embodiment, the transmitting power of the PLC communication during the charging with direct current is reduced compared to the transmitting power of the PLC communication during the charging with alternating current.

In a further embodiment, the exchange of information relating to the charging operation via the PLC communication is based on the standard ISO/IEC 15118 and/or ISO/IEC 61851.

In a further embodiment, the PLC communication takes place on the basis of a standard from the Homeplug family, in particular on the basis of Homeplug Green PHY, and/or on the basis of the G3 standard.

In a further embodiment, a charging plug according to Type 2 in the standard IEC 62196 or a modification of this charging plug, which comprises the separate third connecting elements is used as the first terminal.

Another embodiment provides a charging point for charging at least one energy store of an electric vehicle, which is connected to a charging cable comprising a first terminal having first connecting elements, wherein the at least one energy store can be charged via the charging point using the first terminal of the charging cable, wherein during the charging of the at least one energy store, the first connecting elements are connected to corresponding second connecting elements of a second terminal on the vehicle side and the first and second connecting elements are designed to supply alternating current for charging the at least one energy store, wherein the charging point is embodied such that in the context of the charging of the at least one energy store direct current from the charging point for charging the at least one energy store is supplied to the electric vehicle via at least two first connecting elements or at least two separate third connecting elements of the first terminal, wherein PLC communication between the electric vehicle and charging point in order to exchange information relating to the charging operation takes place via one or more first connecting elements on which no direct current for charging is carried.

In a further embodiment, the charging point is designed to carry out any of the methods disclosed above.

Another embodiment provides an electric vehicle having at least on energy store, wherein the electric vehicle is embodied such that the at least one energy store can be charged via a charging point as disclosed above.

Another embodiment provides a charging cable embodied such that it can be used in any of the methods disclosed above, wherein the conductor or conductors in the charging cable, which lead to the first connecting element or elements via which the PLC communication takes place, are electromagnetically screened.

BRIEF DESCRIPTION OF THE DRAWINGS

Exemplary embodiments will be explained in more detail below on the basis of the schematic drawings, wherein.

DETAILED DESCRIPTION

Figure 1:
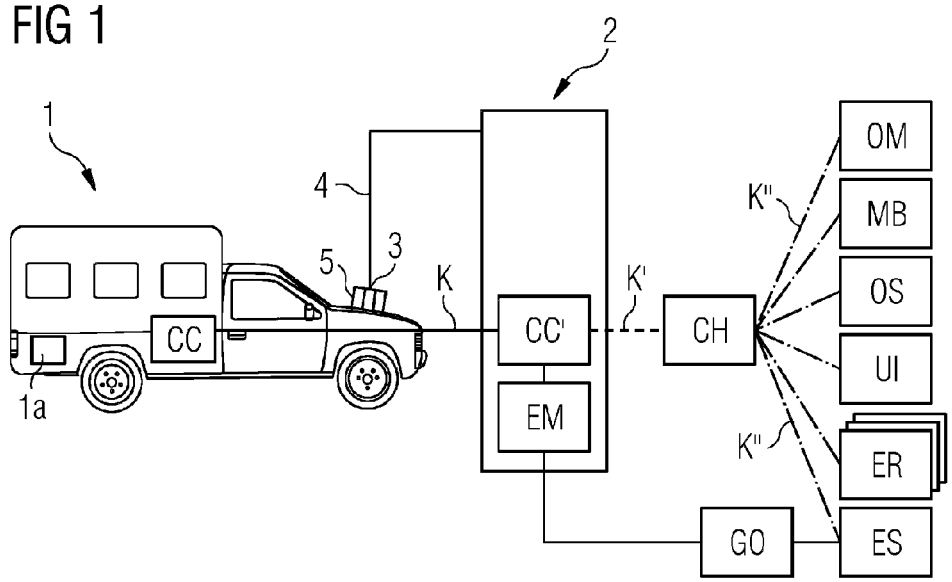
FIG. 1 shows a schematic view of the communication between a charging point with a electric vehicle and with further components, wherein the disclosed method can be used during the course of the communication between the charging point and electric vehicle.

Embodiments of the present disclosure may enable the terminals used for alternating-current charging also to be used for direct-current charging and at the same time simultaneously facilitate reliable PLC communication.

In a method according to some embodiments, at least one energy store of an electric vehicle is charged via a charging point using first connecting elements of a first terminal of a charging cable connected to the charging point. In this context, the first connecting elements are connected to corresponding second connecting elements of a second terminal mounted on the vehicle, wherein the first and second connecting elements are designed to supply alternating current from the charging point for charging the at least one energy store. This means that the corresponding first and second connecting elements are connecting elements provided per se for alternating-current charging. In particular, these connecting elements can be corresponding pins of a type 2 plug according to the standard IEC 62196.

In the disclosed method, direct current from the charging point for charging the at least one energy store is fed to the electric vehicle via at least two first connecting elements or at least two separate third connecting elements of the first terminal, wherein PLC communication between the vehicle and the charging point in order to exchange information relating to the charging operation takes place via one or more first connecting elements on which no direct current for charging is carried.

In some embodiments, first connecting elements of a first terminal which are provided per se for alternating-current charging are now used to implement a PLC communication between the vehicle and charging station during direct-current charging. During this, it is ensured that the connecting elements used for PLC-communication do not carry any direct current thus reducing interference in the PLC communication.

In one embodiment, the conductor or the conductors in the charging cable, which lead to the first connecting element or elements via which the PLC communication takes place, are electromagnetically screened. This is a particularly efficient way to prevent the electromagnetic emission or injection of signals via the PLC communication conductors. Electromagnetic screening of the corresponding conductors can be achieved by an embodiment as a twisted pair or by metallic screening, such as, for example, a wire mesh or a continuous metallic coating.

In a further embodiment of the method, during the charging with direct current from the charging point, one or more non-current-carrying conductors are arranged between the conductor or conductors in the charging cable, which lead to the first connecting element or elements, via which the PLC communication takes place, and the conductors, which lead to the at least two first connecting elements, via which direct current is supplied from the charging point for charging the at least one energy store. Here and in the following, current-carrying or non-current-carrying conductors should be understood to mean conductors which carry charging current or no charging current. This means non-current-carrying conductors can optionally carry current during the course of a communication but not for charging the energy store. According to the above-described embodiment, the conductors provided for the PLC communication are screened from other current-carrying conductors via one or more intermediate non-current-carrying conductors. Intermediary conductors can, for example, be the conductor which is used as the grounding conductor in the event of alternating-current charging.

In a further embodiment of the method, the first connecting element or elements, via which PLC communication takes place during the charging with direct current, correspond to the first connecting elements which are used during charging with alternating current for PLC communication. This enables PLC communication on the vehicle always to be coupled via the same second connecting elements regardless of whether the charging is by alternating current or by direct current.

In a further embodiment of the method, the direct current is supplied via a charging cable attached to the charging point (i.e. when used as prescribed, it is connected non-detachably thereto). This takes into account the fact that, as a rule, during charging with direct current, high-speed charging of the energy store of the vehicle is effected so that it is advantageous with such a procedure that it is no longer necessary for the vehicle user to have to separately attach a charging cable between the vehicle and the charging point instead it is possible to use a charging cable that is permanently connected to the charging point to this end.

In a further embodiment of the method, during charging with direct current, the transmitting power of the PLC communication is reduced compared to the transmitting power of the PLC communication during charging with alternating current. This is possible because faults due to the absence of current supply or signal distortion and attenuation due to screening on the first connecting elements used for PLC communication are reduced.

In one embodiment of the method, the exchange of information relating to the charging operation via the PLC communication is based on the standards ISO/IEC 15118 and/or ISO/IEC 61851.

PLC communication within the context of the disclosed method can be based on different standards. In particular, PLC communication can take place on the basis of a standard from the so-called Homeplug family, e.g., on the basis of Homeplug Green PHY, and/or on the basis of the G3 standard.

As mentioned above, a type 2 charging plug according to the standard IEC 62196 can be used as the first terminal. There is also the option of using a modification of this charging plug in the form of a combined plug, which also comprises the separate third connecting elements which are provided exclusively for charging by means of direct current.

Other embodiments provide a charging point for charging at least one energy store of an electric vehicle, which is connected to a charging cable comprising a first terminal with first connecting elements. Hence, the charging cable is part of the charging point. At the same time, the charging point can be used, using the first terminal of the charging cable, to charge the at least one energy store, wherein, during the charging of the at least one energy store, the first connecting elements are connected to corresponding second connecting elements of a second terminal on the vehicle side and the first and second connecting elements are designed to supply alternating current for charging the at least one energy store.

The charging point according may be designed such that, in the context of the charging of the at least one energy store, direct current from the charging point for charging the at least one energy store is supplied to the electric vehicle via at least two first connecting elements or at least two separate third connecting elements of the first terminal, wherein PLC communication between the vehicle and charging point in order to exchange information relating to the charging operation takes place via one or more first connecting elements, on which no direct current for charging is carried. The charging point may be designed to perform one or more of the above-described variants of the disclosed method.

Other embodiments provide an electric vehicle with at least one energy store, wherein the electric vehicle is embodied such that the at least one energy store can be charged via the disclosed charging point. I.e., the electric vehicle comprises the above-defined second terminal with second connecting elements and corresponding mechanisms, via which the direct current is supplied to the energy store in the vehicle or PLC communication signals are processed. When separate third connecting elements are used, in the vehicle they are connected to corresponding separate connecting elements of the second terminal on the vehicle.

Other embodiments provide a charging cable embodied such that it can be used in the disclosed method for charging at least one energy store of a electric vehicle, wherein the conductor or conductors in the charging cable, which lead to the or the first connecting elements, via which the PLC communication takes place, are electromagnetically screened.

The standards ISO/IEC 61851 and ISO/IEC 15118 are being developed at present for the implementation of an infrastructure for charging the batteries of an electric vehicle, with these standards being intended to standardize communication between an electric vehicle and a corresponding charging point for charging the battery of the vehicle with electricity. The following embodiments are described with reference to these standards. FIG. 1 is a schematic diagram of communication between an electric vehicle 1 and a corresponding charging point 2, wherein the charging point 2 can also communicate with further logic components. In accordance with FIG. 1, the electric vehicle 1 comprises a battery 1a and a communication control unit CC. This communication control unit CC communicates with a corresponding communication control unit CC' within the charging point or charging column 2. The communication between the control units CC and CC' is indicated schematically by the continuous line K. This communication is to be standardized in accordance with the ISO/IEC 15118 and ISO/IEC 61851 family of standards.

In accordance with FIG. 1, the vehicle 1 is connected via a plug 3 of a charging cable 4 to a corresponding socket 5 on the vehicle 1, wherein this connection is only indicated schematically. The charging cable 4 is further permanently (i.e. non-detachably) connected to the charging column 2. In accordance with the scenario shown, a driver wishing to charge the battery 1a of his electric vehicle 1 has plugged the vehicle onto the charging cable 4 via the plug 3 and socket 5 in order, in this way, to supply charging current from the charging point 2 to the battery 1a via the charging cable. During the course of the charging operation, communication K takes place between the vehicle 1 and the charging point 2. In the case of (not shown) alternating-current charging, the communication K comprises PLC communication via current-carrying conductors in the charging cable.

In the scenario in accordance with FIG. 1, the charging of the electric vehicle takes place via a charging point, which provides direct current as the charging current. However, it is also possible to charge the battery of the vehicle at other charging points via alternating current. To this end, a charging unit (not shown) is provided in the vehicle 1, which inter alia comprises an alternating current-direct current-converter. In the case of direct-current charging, a converter of this kind is already provided in the charging column 2.

The connection between vehicle 1 and charging cable 4 via a plug 3 and socket 5 is embodied per se for charging by means of alternating current. For example, the plug 3 is embodied as a conventional type 2 alternating current-charging plug in accordance with the standard IEC 62196. In the embodiment shown here, connecting elements of the plug 3 are used for functions during the course of the direct-current charging. In particular, connecting elements of the plug 3, via which conventionally alternating current is supplied, are now used for PLC communication during the course of the communication link K. Unlike the case with alternating-current charging, these connecting elements are not used parallel to the supply of charging current, as will be described in further detail below.

According to FIG. 1, further components are provided in order to provide the current drawn by the vehicle to the owner of the vehicle in a suitable manner and to charge him for this. The electrical energy is supplied to the charging column 2 via a grid operator GO, wherein the grid operator obtains the energy from an electricity supplier or power supply company ES. In this case, the energy drawn from the charging point 2 is detected by an electricity meter EM within the charging point. The cost of the energy required to charge the battery of the vehicle 1 is calculated via an accounting point CH in suitable manner, wherein, to this end, the accounting point, communicates with the communication control unit CC of the charging point 2, as indicated by the dashed arrow K'. This communication K' will be standardized at message level in the standard ISO/IEC 15118.

The accounting point CH can communicate with further components, wherein the communication with the further components is indicated by dashed lines, which, for reasons clarity, are only partially provided with reference characters K". In this case, the component OM represents the original manufacturer of the vehicle 1. The component MB relates to a mobility operator, for example the rental company of a fleet of vehicles, to which the vehicle 1 also belongs. The component OS provides further value-added services of any desired form. The component UI is a user interface, for example a mobile telephone of the vehicle owner 1, via which information is transmitted to the vehicle owner from the accounting point information. The component ER relates to one or more electricity retailers, via which current can be drawn as an alternative or in addition to the energy supplier ES shown. The communication K" with the further components is not subject to the standardization in accordance with the standard ISO/IEC 15118. The communication between the accounting point CH and the charging point 2 or the further components is not essential for the disclosed method so that these communication paths will not be discussed further.

Figure 2:
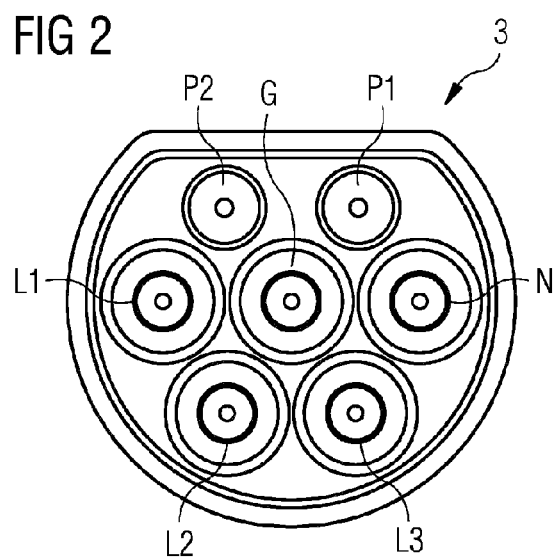
FIG. 2 shows a schematic view of the design of a plug of a charging cable used in a first embodiment.

In one variant of the method, the plug 3 shown in FIG. 2 is used for the direct-current charging of the vehicle 1 via the charging point 2, said plug being inserted in the corresponding socket 5 on the side of the vehicle. This plug is aforementioned type 2 according to the standard IEC 62196. The plug comprises as connecting elements a plurality of pins. In this case, in the case of alternating-current charging, the three pins, L1, L2 and L3 and the neutral conductor pin N and the grounding pin G are provided to supply the three-phase charging current. Furthermore, the plug comprises a control pin P1, which is also referred to as the pilot pin, and a further pin P2, which is used to detect, via an electrical resistance, whether the plug 3 is inserted in the corresponding socket 5 on the vehicle and the power with which the charging cable can be loaded. The pilot pin P1 is used to signal basic information by means of a signaling line (not shown in FIG. 1). In particular, it is possible for the following information to be signaled: whether the cable is plugged in or in contact on both sides (this is only determined on one side via the pin P2), which charging power is available and the condition of the vehicle. During the course of direct-current charging, the pilot pin P1 will provide the information that charging with direct current is taking place.

In the case of alternating-current charging via the plug 3 in FIG. 2, PLC communication is performed via at least two of the pins L1 to L3, N and G, which are connected to current-carrying conductors of the charging cable, with which communication further information relating to the charging operation are transmitted, such as, for example, charging profiles, power limits and further control parameters. Data transmission by means of a PLC communication via current-carrying conductors has the drawback that the current-carrying conductors cause a strong electromagnetic emission or a large amount of electromagnetic radiation to be injected into the current-carrying conductors. This results in the problems mentioned in the introduction, in particular the problem of the correct association between the vehicle and charging column and the problem of the reduced bandwidth. In the embodiments explained in the following, these problems with direct-current charging are avoided using the plug 3 in FIG. 2 or the plug 3' in FIG. 3.

When the plug 3 is used for the direct-current charging shown in FIG. 1, similarly to the case with alternating-current charging, communication takes place via the pilot pin P1 and, based on PLC, via at least two of the pins L1 to L3, G and N. In addition, the direct current is supplied via two of these pins L1 to L3, G and N by means of conductors in the charging cable connected thereto. In this case, it may be essential in some embodiments that the pins to supply the direct current are different from the pins used for PLC communication. In one embodiment, it is, for example, possible for the pins L1 and N to be connected to conductors in the charging cable, via which the PLC communication takes place, while the pins L2 and L3 are connected to other conductors in the charging cable, via which the direct current is supplied. Unlike the case with alternating-current charging, PLC communication is hence decoupled from the current conduction. This reduces disturbances caused by the voltage supply. In one embodiment, the conductors in the charging cable, which is used for PLC communication, are in particular screened against electromagnetic radiation. In particular, the conductors can be embodied as a twisted pair or provided with a metallic screen or wire mesh. This reduces the electromagnetic emission from the conductor and the injection of radiation from adjacent PLC transmitters.

In a further embodiment, screening of the conductors provided for PLC communication can also be achieved in that a conductor in the charging cable, for example the grounding conductor connected to the earthing pin G is guided such that it lies between the conductors used for PLC communication and the current-carrying conductors. In a further embodiment, during the course of direct current-charging, the same pins are used for PLC communication as are used for PLC communication in the case of alternating current-charging. This is advantageous, since the corresponding PLC modem on the vehicle can be coupled via the same pins for charging with direct current and for charging with alternating current. For example, in the case of alternating current charging, both the power supply and PLC communication can take place via the pins L1 and N, while, in the case of direct current-charging, although PLC communication also takes place via the pins L1 and N, the direct current supply is implemented via the pins L2 and L3.

Figure 3:
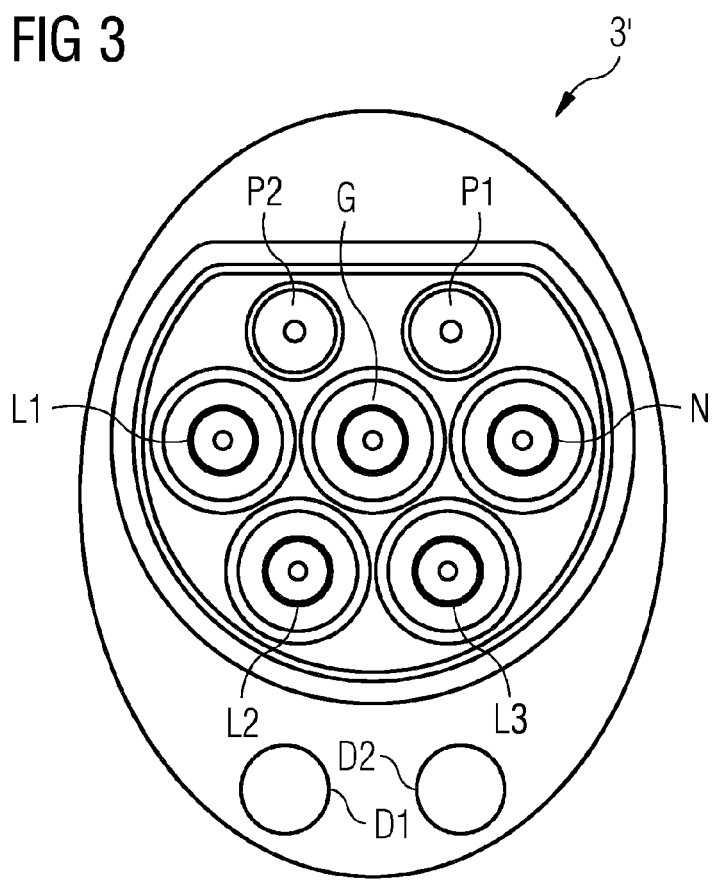
FIG. 3 shows a schematic view of the design of a plug of a charging cable used in a second embodiment.

FIG. 3 shows a modification of the plug in FIG. 2 with the reference character 3'. This plug can also be used in an embodiment of the disclosed method. Similarly to the plug in FIG. 2, the plug 3' comprises the same pins L1, L2, L3, N, G and P1 and P2. In the case of alternating current-charging, these pins are used in the same manner as in the conventional type 2 plug according to the standard IEC 62196. Unlike the plug in FIG. 2, in the case of direct-current charging, the supply of the charging current takes place via separate direct current-terminals D1 and D2, which may be designed for charging with higher currents. Consequently, the conductors in the charging cable connected to the terminals D1 and D2 are also designed for higher currents. For the PLC communication, once again, two of the pins L1, L2, L3, N and G are used in the plug 3', said pins being current-carrying so that the above-described advantages in the context of the PLC communication can also be achieved for this plug.

What is claimed is:

1. A method for charging at least one energy store of an electric vehicle by supplying direct current (DC) from a charging point over a charging cable configured for supplying alternating current (AC), the method comprising:

connecting the electric vehicle to the charging point via the charging cable, the charging cable having a plurality of first AC-configured connecting elements that are (a) connected at a first end to the charging point and (b) connected at a second end to corresponding second connecting elements of a second terminal on the vehicle side, wherein the plurality of first AC-configured connecting elements comprise interfaces configured for connection to an alternating current source to supply alternating current for charging the at least one energy store of the vehicle, supplying direct current from the charging point for charging the at least one energy store to the electric vehicle via at least two of the first AC-configured connecting elements or at least two separate third connecting elements of the charging cable, during the supply of direct current from the charging point to the electric vehicle via the at least two first AC-configured connecting elements or the at least two third connecting elements, performing power line communication (PLC) between the electric vehicle and the charging point to exchange information relating to the charging operation via one or more of the first AC-configured connecting elements on which no alternating current or direct current for charging is being carried.

2. The method of claim 1, wherein the conductor or conductors in the charging cable, which lead to the first AC-configured connecting element or elements via which the PLC communication takes place, are electromagnetically screened.

3. The method of claim 2, wherein the electromagnetically screened conductor or the electromagnetically screened conductors are designed as twisted pairs and have a metallic screening.

4. The method of claim 1, wherein, during the charging with direct current from the charging point, one or more non-current-carrying conductors are arranged between the conductor or conductors in the charging cable, which lead to the first AC-configured connecting element or elements, via which the PLC communication takes place, and the conductors, which lead to the at least two first AC-configured connecting elements, via which direct current is supplied from the charging point for charging the at least one energy store.

5. The method of claim 1, wherein the first AC-configured connecting element or elements, via which the PLC communication during the charging with direct current takes place, correspond to the first AC-configured connecting elements which are used during the charging with alternating current for PLC communication.

6. The method of claim 1, wherein the direct current is supplied via a charging cable attached to the charging point.

7. The method of claim 1, wherein the transmitting power of the PLC communication during the charging with direct current is reduced compared to the transmitting power of the PLC communication during the charging with alternating current.

8. The method of claim 1, wherein the exchange of information relating to the charging operation via the PLC communication is based on a standard selected from the group consisting of the ISO/IEC 15118 standard and the ISO/IEC 61851 standard.

9. The method of claim 1, wherein the PLC communication takes place based on a standard from the Homeplug family selected from the group consisting of Homeplug Green PHY and the G3 standard.

10. The method of claim 1, wherein a charging plug according to Type 2 in the standard IEC 62196 or a modification of this charging plug, which comprises the separate third connecting elements, is used as the first terminal.

11. A charging cable embodied for used in the method of claim 1, wherein the conductor or conductors in the charging cable, which lead to the first AC-configured connecting element or elements via which the PLC communication takes place, are electromagnetically screened.

12. A charging point for charging at least one energy store of an electric vehicle by supplying direct current (DC) from to the electric vehicle over a charging cable configured for supplying alternating current (AC), the charging point comprising:
a first terminal connected to a first terminal of the charging cable comprising having a plurality of first AC-configured connecting elements configured for connection to an alternating current source to carry alternating current,
wherein the charging point is configured to charge the at least one energy store via the charging point using the first terminal of the charging cable,
wherein during the charging of the at least one energy store, the first AC-configured connecting elements are connected to corresponding second connecting elements of a second terminal on the vehicle side, the second connecting elements being configured for connection to the first AC-configured connecting elements of the charging cable to supply alternating current for charging the at least one energy store,
wherein the charging point is configured to:
supply direct current to the electric vehicle via at least two of the first AC-configured connecting elements or at least two separate third connecting elements of the first terminal, and
during the supply of direct current from the charging point to the electric vehicle via the at least two first AC-configured connecting elements or the at least two third connecting elements, perform PLC communication between the electric vehicle and the charging point to exchange information relating to the charging operation via one or more of the first AC-configured connecting elements on which no alternating current or direct current for charging is being carried.

13. An electric vehicle having at least on energy store, wherein the electric vehicle is configured for charging the at least one energy store via a charging point in accordance with claim 12.

* * * * *